US012757288B2

(12) United States Patent
Byun et al.

(10) Patent No.: US 12,757,288 B2
(45) Date of Patent: Oct. 6, 2026

(54) METHOD AND APPARATUS FOR A DRX CONFIGURATION FOR XR TRAFFIC IN A WIRELESS NETWORK SYSTEM

(71) Applicant: LG ELECTRONICS INC., Seoul (KR)

(72) Inventors: Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 18/722,506

(22) PCT Filed: Jan. 4, 2024

(86) PCT No.: PCT/KR2024/000187
§ 371 (c)(1),
(2) Date: Jun. 20, 2024

(87) PCT Pub. No.: WO2024/162632
PCT Pub. Date: Aug. 8, 2024

(65) Prior Publication Data
US 2026/0156712 A1 Jun. 4, 2026

Related U.S. Application Data

(60) Provisional application No. 63/442,120, filed on Jan. 31, 2023.

(51) Int. Cl.
*H04W 76/28* (2018.01)
*H04W 24/06* (2009.01)

(52) U.S. Cl.
CPC ........... *H04W 76/28* (2018.02); *H04W 24/06* (2013.01)

(58) Field of Classification Search
CPC ..... H04W 80/02; H04W 76/28; H04W 76/04; H04W 72/23; H04W 72/12;
(Continued)

(56) References Cited

U.S. PATENT DOCUMENTS

2020/0389933 A1* 12/2020 Ang ...................... H04W 76/28
2021/0321480 A1* 10/2021 Kwon ................... H04W 72/23
(Continued)

FOREIGN PATENT DOCUMENTS

WO 2022/115015 A1 6/2022
WO 2023/003438 A1 1/2023

OTHER PUBLICATIONS

Qualcomm Incorporated, "Moderator Summary#1 on XR specific power saving techniques", 3GPP TSG RAN WG1 #109-e, R1-2205055, e-Meeting, May 9-20, 2022.
(Continued)

*Primary Examiner* — Bailor C Hsu
(74) *Attorney, Agent, or Firm* — BRYAN CAVE LEIGHTON PAISNER LLP

(57) ABSTRACT

A method and apparatus for a DRX configuration for XR traffic in a wireless network system is provided. A CU of a RAN node transmits a first message including information on a DRX configuration for XR traffic, wherein the DRX configuration for the XR traffic includes a first set of periodicities for the XR traffic. The CU determines that the DRX configuration is updated. The CU transmits a second message including information on the updated DRX configuration for the XR traffic, wherein the updated DRX configuration for the XR traffic includes a second set of periodicities for the XR traffic.

20 Claims, 21 Drawing Sheets

(58) Field of Classification Search
CPC . H04W 72/0446; H04W 56/00; H04W 52/02; H04W 24/06; H04L 5/14; H04L 1/1607
See application file for complete search history.

(56) References Cited

U.S. PATENT DOCUMENTS

| | | | | |
|---|---|---|---|---|
| 2022/0232477 | A1* | 7/2022 | Kim | H04W 52/0229 |
| 2022/0330152 | A1* | 10/2022 | Hande | H04W 52/028 |
| 2023/0008854 | A1* | 1/2023 | Lee | H04W 76/28 |
| 2023/0292237 | A1* | 9/2023 | Mondet | H04W 52/0216 |
| 2023/0363043 | A1* | 11/2023 | Huang | H04W 52/0216 |

OTHER PUBLICATIONS

Qualcomm Incorporated, "DRX enhancements for XR", 3GPP TSG-RAN WG2 Meeting #119bis-e, R2-2209453, e-Meeting, Oct. 10-19, 2022.
LG Electronics Inc., "DRX enhancement for power saving in XR", 3GPP TSG-RAN2#119bis-e, R2-2210009, Online, Oct. 10-19, 2022.

* cited by examiner

METHOD AND APPARATUS FOR A DRX CONFIGURATION FOR XR TRAFFIC IN A WIRELESS NETWORK SYSTEM

CROSS-REFERENCE TO RELATED APPLICATIONS

This application is the National Stage filing under 35 U.S.C. 371 of International Application No. PCT/KR2024/000187, filed on Jan. 4, 2024, which claims the benefit of U.S. Provisional Applications No. 63/442,120 filed on Jan. 31, 2023, which is hereby incorporated by reference herein in its entirety.

TECHNICAL FIELD

The present disclosure relates to a method and apparatus for a DRX configuration for XR traffic in a wireless network system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NR, various signals for extended reality (XR) service are being discussed.

For example, discussions for NR enhancements are ongoing as follows.

Specify the enhancements related to power saving:

DRX support of XR frame rates corresponding to non-integer periodicities (through at least semi-static mechanisms e.g. RRC signalling);

Specify the enhancements related to capacity:

Multiple CG PUSCH transmission occasions in a period of a single CG PUSCH configuration;

Dynamic indication of unused CG PUSCH occasion(s) based on UCI by the UE;

BSR enhancements including at least new BS Table(s);

Delay reporting of buffered data in uplink;

Provision of XR traffic assistance information for DL and UL (e.g. periodicity)

Discard operation of PDU Sets;

In particular, in relation to DRX support of XR frame rates corresponding to non-integer periodicities, it is necessary to provide a method for supporting DRX with multiple non-integer DRX configuration values for power saving of a terminal that transmits and receives XR traffic.

In addition, due to the nature of XR traffic, the DRX configuration value to support DRX can change frequently. Therefore, if the base station is split into CU-DU, for considering these issues, a method for efficiently managing DRX configuration for providing DRX to a terminal that transmits and receives XR traffic is required.

Therefore, studies for a DRX configuration for XR traffic in a wireless network system are required.

In an aspect, a method performed by a Central Unit (CU) of a Radio Access Network (RAN) node in a wireless communication system is provided. The method comprising: transmitting, to a Distributed Unit (DU) of the RAN node, a first message including information on a Discontinuous Reception (DRX) configuration for Extended reality (XR) traffic, wherein the DRX configuration for the XR traffic includes a first set of periodicities for the XR traffic; determining that the DRX configuration is updated; transmitting, to the DU of the RAN node, a second message including information on the updated DRX configuration for the XR traffic, wherein the updated DRX configuration for the XR traffic includes a second set of periodicities for the XR traffic.

In another aspect, an apparatus for implementing the above method is provided.

The present disclosure can have various advantageous effects.

According to some embodiments of the present disclosure, a gNB in CU-DU split could efficiently handle the DRX configuration for XR traffic. In particular, by providing the DRX configuration including a set of periodicities for the XR traffic, the CU of the gNB could efficiently provide the DRX configuration form the XR traffic.

For example, when a CU-DU split base station performs DRX for UEs transmitting and receiving XR traffic, the gNB-CU may provide the gNB-DU with DRX configuration information considering XR traffic characteristics in advance. If updating of corresponding information is required, updated DRX configuration information may also be provided. Since information can be provided in a combination of set and index, information provided during gNB-CU and gNB-DU signaling can be minimized. In addition, through this, the power saving effect of the terminal can be expected by providing DRX to the terminal that transmits and receives XR traffic.

In other words, the gNB-CU may provide DRX configuration considering XR traffic characteristics to the gNB-DU in advance, otherwise the gNB-CU may update and provide the DRX configuration. Corresponding information may be provided as a combination of set and index. Thus, information provided during signaling between the gNB-CU and the gNB-DU could be minimized. In addition, by providing the corresponding information to a terminal that transmits and receives XR traffic, the terminal could save power by applying DRX.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
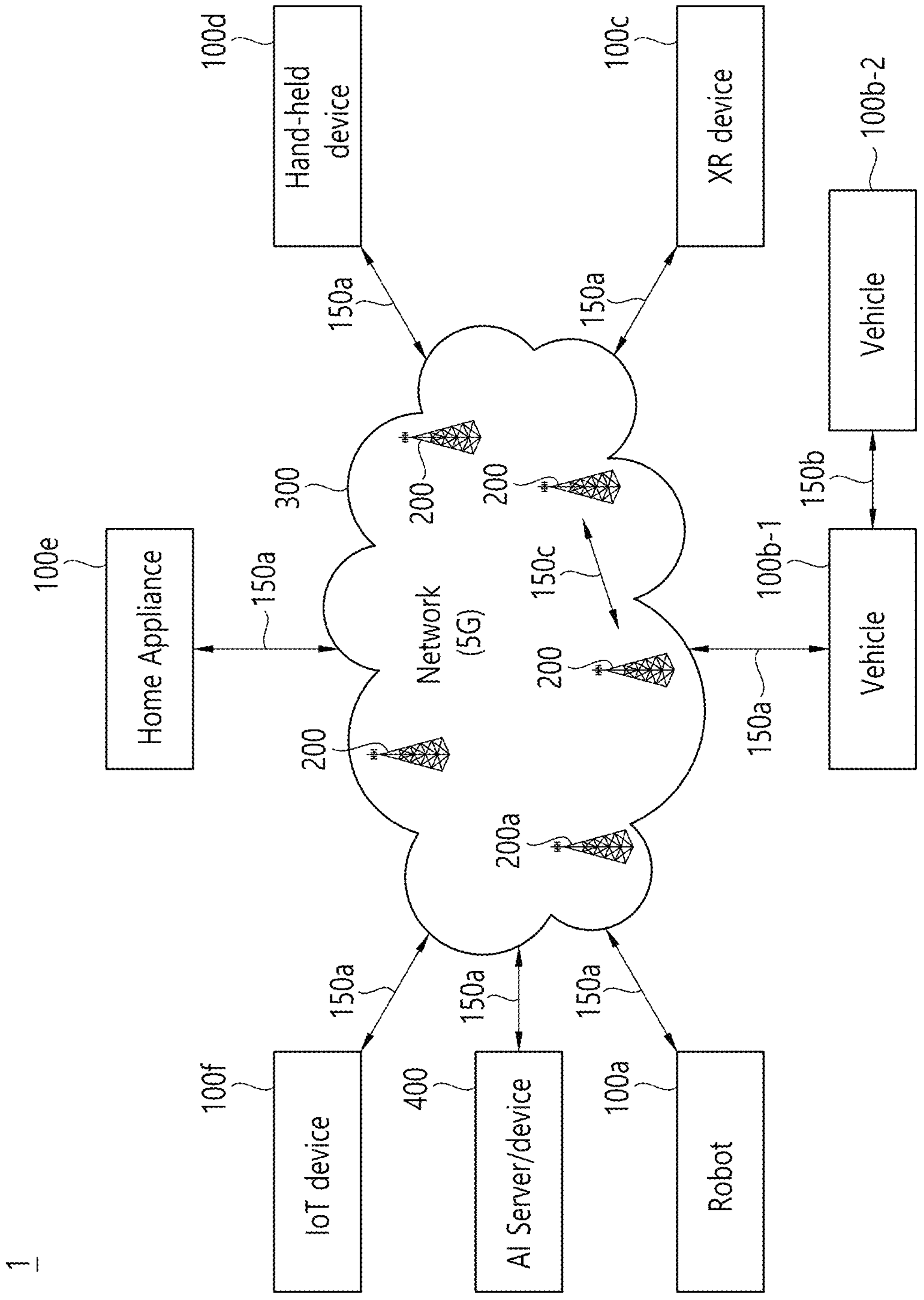
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, “A or B” may mean “only A”, “only B”, or “both A and B”. In other words, “A or B” in the present disclosure may be interpreted as “A and/or B”. For example, “A, B or C” in the present disclosure may mean “only A”, “only B”, “only C”, or “any combination of A, B and C”.

In the present disclosure, slash (/) or comma (,) may mean “and/or”. For example, “A/B” may mean “A and/or B”. Accordingly, “A/B” may mean “only A”, “only B”, or “both A and B”. For example, “A, B, C” may mean “A, B or C”.

In the present disclosure, “at least one of A and B” may mean “only A”, “only B” or “both A and B”. In addition, the expression “at least one of A or B” or “at least one of A and/or B” in the present disclosure may be interpreted as same as “at least one of A and B”.

In addition, in the present disclosure, “at least one of A, B and C” may mean “only A”, “only B”, “only C”, or “any combination of A, B and C”. In addition, “at least one of A, B or C” or “at least one of A, B and/or C” may mean “at least one of A, B and C”.

Also, parentheses used in the present disclosure may mean “for example”. In detail, when it is shown as “control information (PDCCH)”, “PDCCH” may be proposed as an example of “control information”. In other words, “control information” in the present disclosure is not limited to “PDCCH”, and “PDCCH” may be proposed as an example of “control information”. In addition, even when shown as “control information (i.e., PDCCH)”, “PDCCH” may be proposed as an example of “control information”.

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
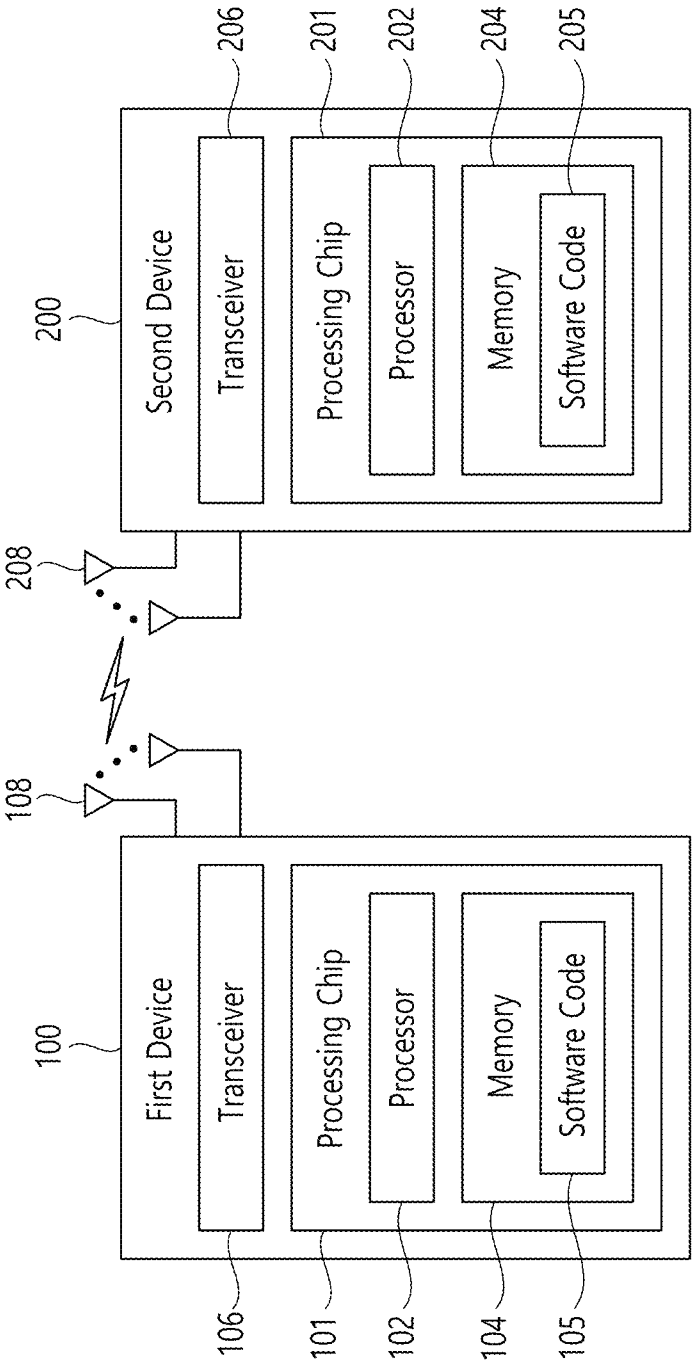
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
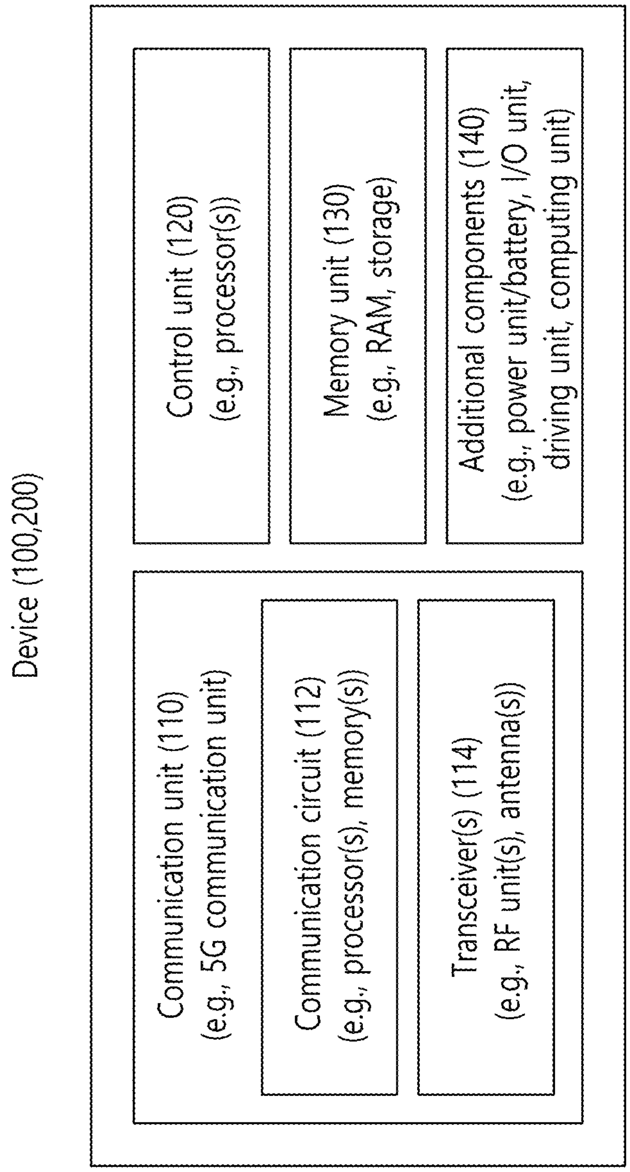
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
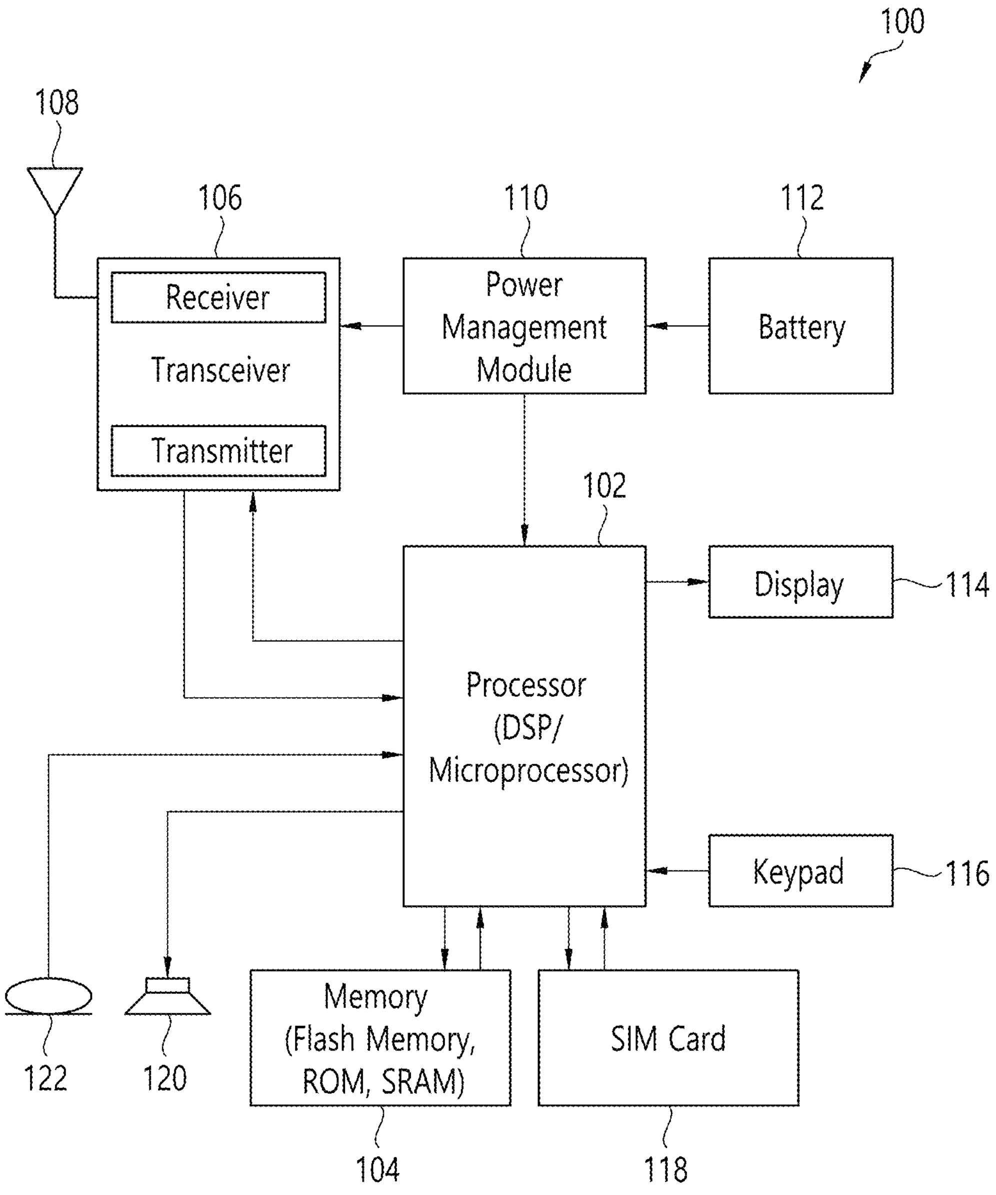
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
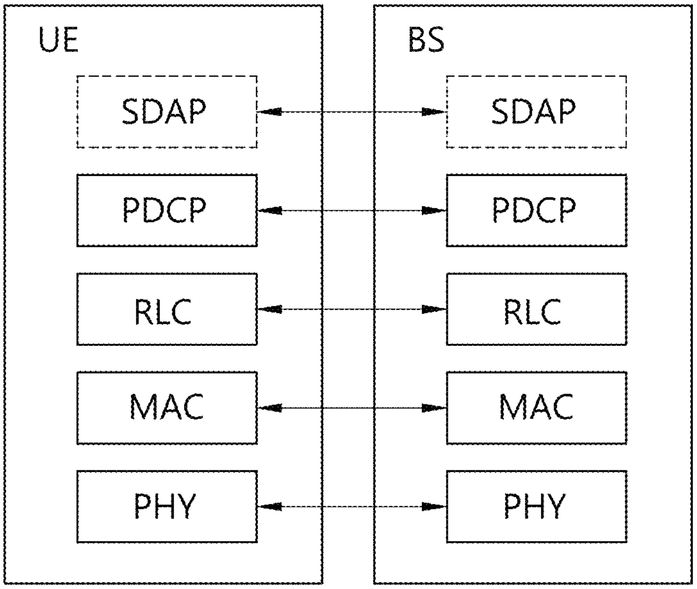
FIGS. 5 and 6 show an example of protocol stacks in a 3GPP based wireless communication system to which implementations of the present disclosure is applied.
Figure 6:
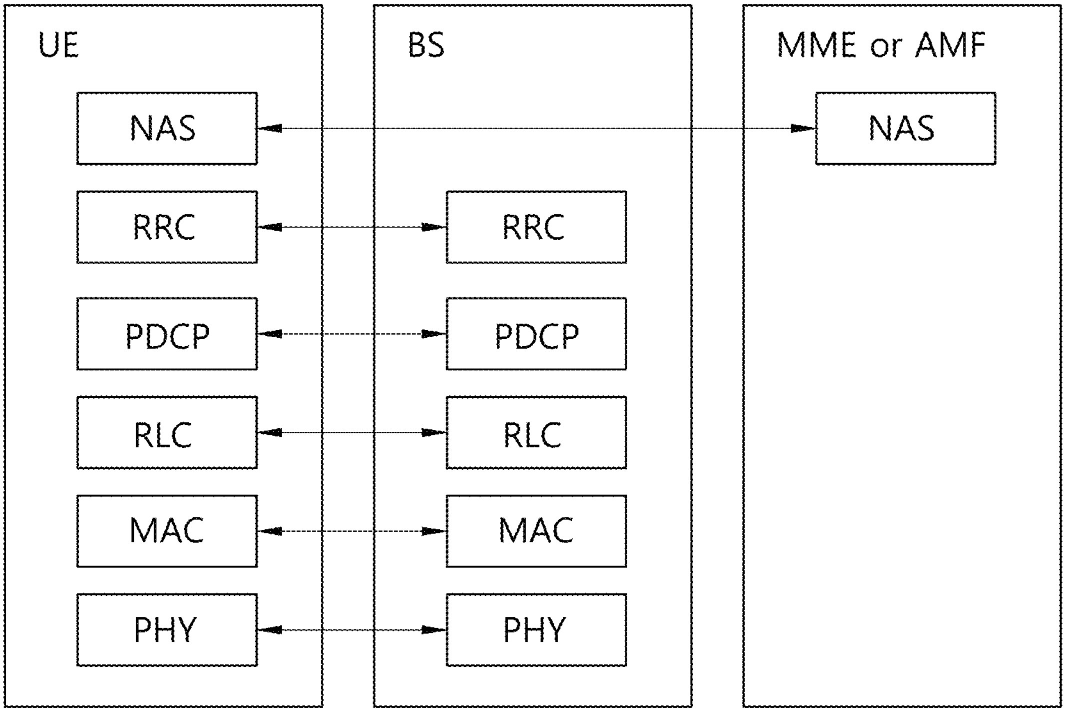

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
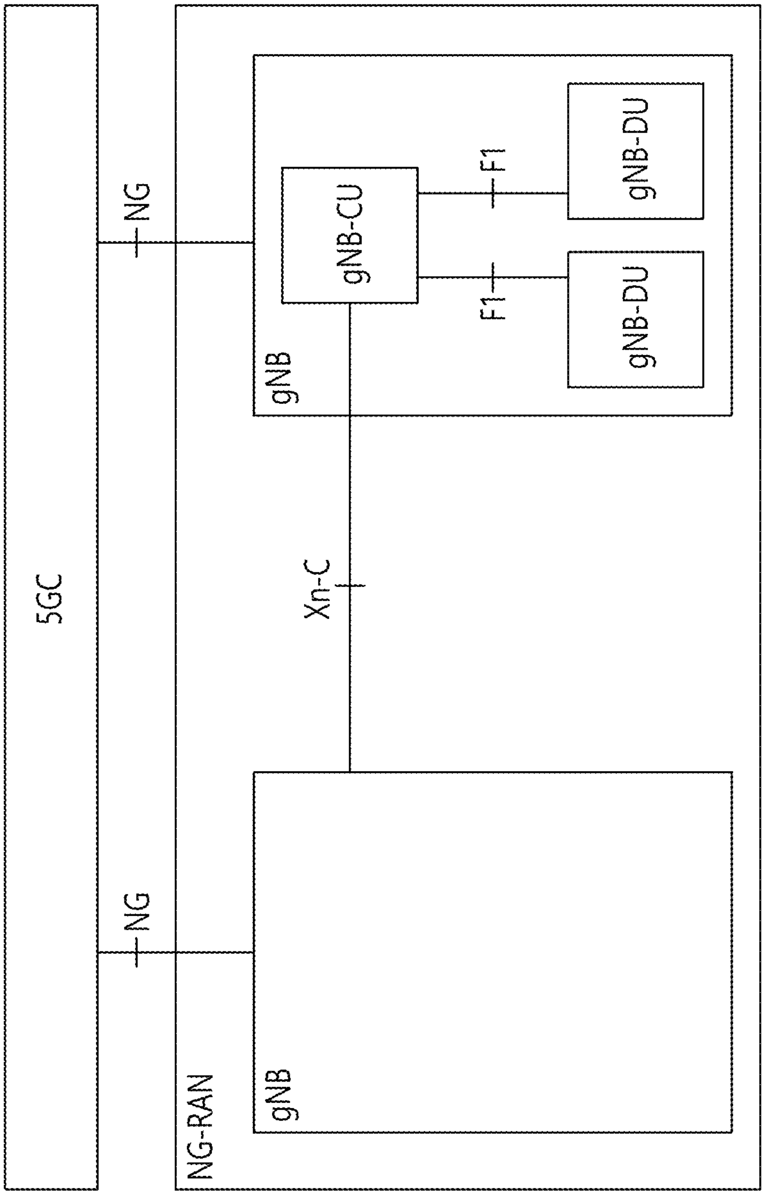
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
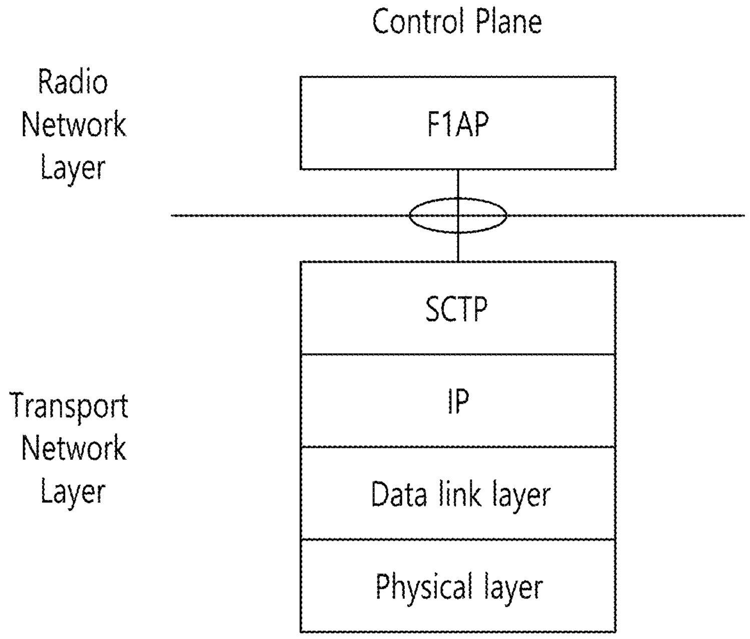
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Hereinafter, technical features related to F1 Setup are described. Section 8.2.3 of 3GPP TS 38.473 v17.3.0 may be referred.

The purpose of the F1 Setup procedure is to exchange application level data needed for the gNB-DU and the gNB-CU to correctly interoperate on the F1 interface. This procedure shall be the first F1AP procedure triggered for the F1-C interface instance after a TNL association has become operational.

If F1-C signalling transport is shared among multiple F1-C interface instances, one F1 Setup procedure is issued per F1-C interface instance to be setup, i.e. several F1 Setup procedures may be issued via the same TNL association after that TNL association has become operational.

Exchange of application level configuration data also applies between the gNB-DU and the gNB-CU in case the DU does not broadcast system information other than for radio frame timing and SFN.

The procedure uses non-UE associated signalling.

This procedure erases any existing application level configuration data in the two nodes and replaces it by the one received. This procedure also re-initialises the F1AP UE-related contexts (if any) and erases all related signalling connections in the two nodes like a Reset procedure would do.

Figure 9:
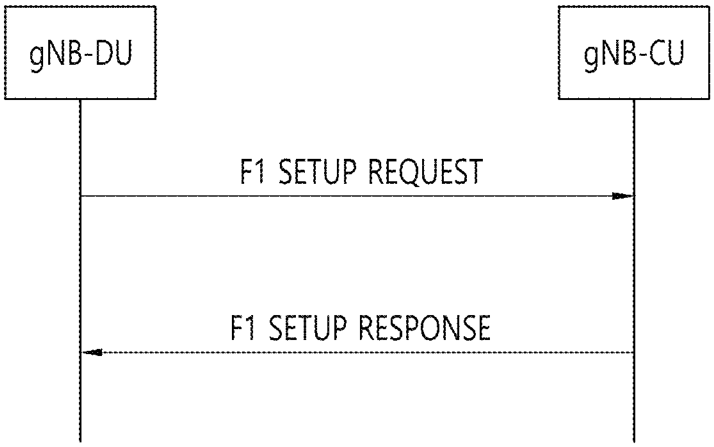
FIG. 9 shows an example of a successful operation for F1 Setup procedure to which implementations of the present disclosure is applied.

FIG. 9 shows an example of a successful operation for F1 Setup procedure to which implementations of the present disclosure is applied.

The gNB-DU initiates the procedure by sending a F1 SETUP REQUEST message including the appropriate data to the gNB-CU. The gNB-CU responds with a F1 SETUP RESPONSE message including the appropriate data.

The exchanged data shall be stored in respective node and used as long as there is an operational TNL association. When this procedure is finished, the F1 interface is operational and other F1 messages may be exchanged.

If the F1 SETUP REQUEST message contains the gNB-DU Name IE, the gNB-CU may use this IE as a human readable name of the gNB-DU. If the F1 SETUP REQUEST message contains the Extended gNB-DU Name IE, the gNB-CU may use this IE as a human readable name of the gNB-DU and shall ignore the gNB-DU Name IE if included.

If the F1 SETUP RESPONSE message contains the gNB-CU Name IE, the gNB-DU may use this IE as a human readable name of the gNB-CU. If the F1 SETUP RESPONSE message contains the Extended gNB-CU Name IE, the gNB-DU may use this IE as a human readable name of the gNB-CU and shall ignore the gNB-CU Name IE if included.

If the F1 SETUP REQUEST message contains the gNB-DU Served Cells List IE, the gNB-CU shall take into account.

For NG-RAN, the gNB-DU shall include the gNB-DU System Information IE and the TAI Slice Support List IE in the F1 SETUP REQUEST message.

The gNB-CU may include the Cells to be Activated List IE in the F1 SETUP RESPONSE message. The Cells to be Activated List IE includes a list of cells that the gNB-CU requests the gNB-DU to activate. The gNB-DU shall activate the cells included in the Cells to be Activated List IE and reconfigure the physical cell identity for cells for which the NR PCI IE is included.

If Cells to be Activated List Item IE is included in the F1 SETUP RESPONSE message, and the information for the cell indicated by the NR CGI IE includes the IAB Info IAB-donor-CU IE, the gNB-DU shall, if supported, apply the IAB STC Info IE therein to the indicated cell.

For NG-RAN, the gNB-CU shall include the gNB-CU System Information IE in the F1 SETUP RESPONSE message.

For NG-RAN, the gNB-DU may include the RAN Area Code IE in the F1 SETUP REQUEST message. The gNB-CU may use it.

For NG-RAN, the gNB-DU may include Supported MBS FSA ID List IE in the Served Cell Information IE in the F1 SETUP REQUEST message. The gNB-CU may use it.

For NG-RAN, the gNB-CU may include Available PLMN List IE, and optionally also Extended Available PLMN List IE in the F1 SETUP RESPONSE message, if the available PLMN(s) are different from what gNB-DU has provided in F1 SETUP REQUEST message, gNB-DU shall take this into account and only broadcast the PLMN(s) included in the received Available PLMN list(s).

For NG-RAN, the gNB-CU may include Available SNPN ID List IE in the F1 SETUP RESPONSE message. If the available SNPN(s) are different from what gNB-DU has provided in F1 SETUP REQUEST message, gNB-DU shall take this into account and only broadcast the SNPN(s) included in the received Available SNPN ID list.

The Latest RRC Version Enhanced IE shall be included in the F1 SETUP REQUEST message and in the F1 SETUP RESPONSE message.

If in F1 SETUP REQUEST message, the Cell Direction IE is present, the gNB-CU should use it to understand whether the cell is for UL or DL only. If in F1 SETUP REQUEST message, the Cell Direction IE is omitted in the Served Cell Information IE it shall be interpreted as that the Cell Direction is Bi-directional.

If the Intended TDD DL-UL Configuration IE is present in the F1 SETUP REQUEST message, the receiving gNB-CU shall use the received information for Cross Link Interference management and/or NR-DC power coordination. The gNB-CU may merge the Intended TDD DL-UL Configuration information received from two or more gNB-DUs. The gNB-CU shall consider the received Intended TDD DL-UL Configuration content valid until reception of an update of the IE for the same cell(s).

If the Aggressor gNB Set ID IE is included in the Served Cell Information IE in the F1 SETUP REQUEST message, the gNB-CU shall, if supported, take it into account.

If the Victim gNB Set ID IE is included in the Served Cell Information IE in the F1 SETUP REQUEST message, the gNB-CU shall, if supported, take it into account.

If the F1 SETUP REQUEST message contains the Transport Layer Address Info IE, the gNB-CU shall, if supported, take into account for IPSec tunnel establishment.

If the SFN Offset IE is contained in the Served Cell Information IE in the F1 SETUP REQUEST message, the gNB-CU shall, if supported, use this information to deduce the SFNO offset of the reported cell.

If the F1 SETUP RESPONSE message contains the Transport Layer Address Info IE, the gNB-DU shall, if supported, take into account for IPSec tunnel establishment.

If the F1 SETUP RESPONSE message contains the Uplink BH Non-UP Traffic Mapping IE, the gNB-DU shall, if supported, consider the information therein for mapping of non-UP uplink traffic.

If the BAP Address IE is included in the F1 SETUP REQUEST, the receiving gNB-CU shall, if supported, consider the information therein for discovering the collocation of an IAB-DU and an IAB-MT.

If the F1 SETUP REQUEST message is received from an IAB-donor-DU, the gNB-CU shall, if supported, include the BAP Address IE in the F1 SETUP RESPONSE message.

NOTE: How to identify the IAB-donor-DU is up to gNB-CU implementation.

If the F1 SETUP RESPONSE message contains the BAP Address IE, the gNB-DU shall, if supported, store the received BAP address and use it.

If the NR Cell PRACH Configuration IE is included in the Served Cell Information IE contained in the F1 SETUP REQUEST message, the gNB-CU may store the information, and forward it to other RAN nodes for RACH optimisation.

If the RedCap Broadcast Information IE is included in the Served Cell Information IE in the F1 SETUP REQUEST message, the gNB-CU may use this information to determine a suitable target in case of subsequent outgoing mobility involving RedCap UEs.

If the TAI NSAG Support List IE is included in the Served Cell Information IE in the F1 SETUP REQUEST message, the gNB-CU shall, if supported, use this information.

Figure 10:
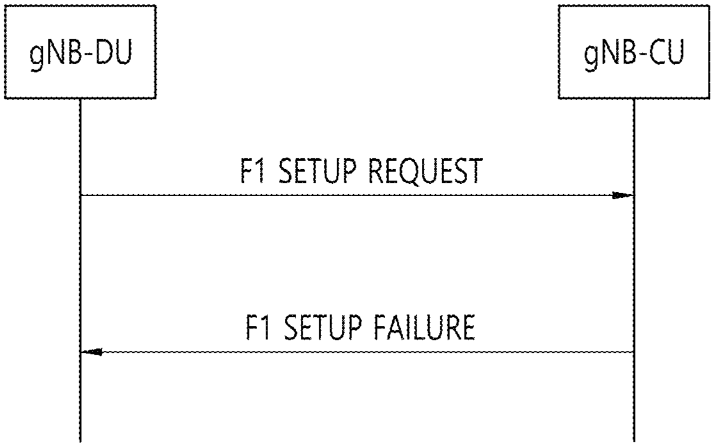
FIG. 10 shows an example of an unsuccessful operation for F1 Setup procedure to which implementations of the present disclosure is applied.

FIG. 10 shows an example of an unsuccessful operation for F1 Setup procedure to which implementations of the present disclosure is applied.

If the gNB-CU cannot accept the setup, it should respond with a F1 SETUP FAILURE and appropriate cause value.

If the F1 SETUP FAILURE message includes the Time To Wait IE, the gNB-DU shall wait at least for the indicated time before reinitiating the F1 setup towards the same gNB-CU.

Hereinafter, technical features related to gNB-DU Configuration Update are described. Section 8.2.4 of 3GPP TS 38.473 v17.3.0 may be referred.

The purpose of the gNB-DU Configuration Update procedure is to update application level configuration data needed for the gNB-DU and the gNB-CU to interoperate correctly on the F1 interface. This procedure does not affect existing UE-related contexts, if any. The procedure uses non-UE associated signalling.

Update of application level configuration data also applies between the gNB-DU and the gNB-CU in case the DU does not broadcast system information other than for radio frame timing and SFN. How to use this information when this option is used is not explicitly specified.

Figure 11:
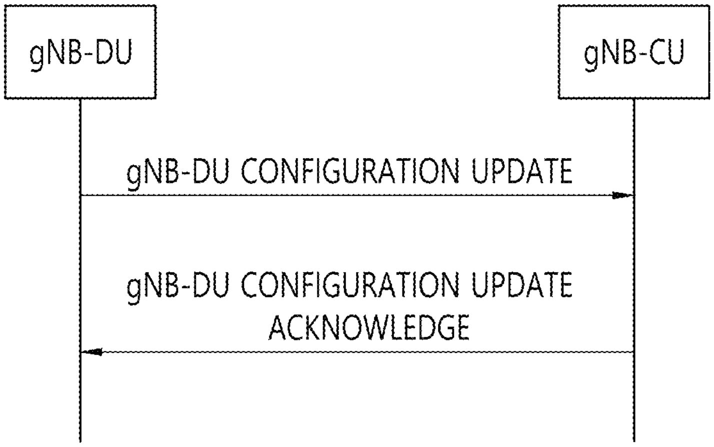
FIG. 11 shows an example of a successful operation for gNB-DU Configuration Update procedure to which implementations of the present disclosure is applied.

FIG. 11 shows an example of a successful operation for gNB-DU Configuration Update procedure to which implementations of the present disclosure is applied.

The gNB-DU initiates the procedure by sending a GNB-DU CONFIGURATION UPDATE message to the gNB-CU including an appropriate set of updated configuration data that it has just taken into operational use. The gNB-CU responds with GNB-DU CONFIGURATION UPDATE ACKNOWLEDGE message to acknowledge that it successfully updated the configuration data. If an information element is not included in the GNB-DU CONFIGURATION UPDATE message, the gNB-CU shall interpret that the corresponding configuration data is not changed and shall continue to operate the F1-C interface with the existing related configuration data.

The updated configuration data shall be stored in both nodes and used as long as there is an operational TNL association or until any further update is performed.

If gNB-DU ID IE is contained in the GNB-DU CONFIGURATION UPDATE message for a newly established SCTP association, the gNB-CU will associate this association with the related gNB-DU.

If Served Cells To Add Item IE is contained in the GNB-DU CONFIGURATION UPDATE message, the gNB-CU shall add cell information according to the information in the Served Cell Information IE. For NG-RAN, the gNB-DU shall include the gNB-DU System Information IE.

If Served Cells To Modify Item IE is contained in the GNB-DU CONFIGURATION UPDATE message, the gNB-CU shall modify information of cell indicated by Old NR CGI IE according to the information in the Served Cell Information IE and overwrite the served cell information for the affected served cell. Further, if the gNB-DU System Information IE is present the gNB-CU shall store and replace any previous information received.

If Served Cells To Delete Item IE is contained in the GNB-DU CONFIGURATION UPDATE message, the gNB-CU shall delete information of cell indicated by Old NR CGI IE.

If Cells Status Item IE is contained in the GNB-DU CONFIGURATION UPDATE message, the gNB-CU shall update the information about the cells. If if the Switching Off Ongoing IE is present in the Cells Status Item IE, contained in the GNB-DU CONFIGURATION UPDATE message, and the corresponding Service State IE is set to "Out-of-Service", the gNB-CU shall ignore the Switching Off Ongoing IE.

If Cells to be Activated List Item IE is contained in the GNB-DU CONFIGURATION UPDATE ACKNOWLEDGE message, the gNB-DU shall activate the cell indicated by NR CGI IE and reconfigure the physical cell identity for cells for which the NR PCI IE is included.

If Cells to be Activated List Item IE is contained in the GNB-DU CONFIGURATION UPDATE ACKNOWLEDGE message and the indicated cells are already activated, the gNB-DU shall update the cell information received in Cells to be Activated List Item IE.

If Cells to be Activated List Item IE is included in the GNB-DU CONFIGURATION UPDATE ACKNOWLEDGE message, and the information for the cell indicated by the NR CGI IE includes the IAB Info IAB-donor-CU IE, the gNB-DU shall, if supported, apply the IAB STC Info IE therein to the indicated cell.

If Cells to be Deactivated List Item IE is contained in the GNB-DU CONFIGURATION UPDATE ACKNOWLEDGE message, the gNB-DU shall deactivate all the cells with NR CGI listed in the IE.

If Dedicated SI Delivery Needed UE List IE is contained in the GNB-DU CONFIGURATION UPDATE message, the gNB-CU should take it into account when informing the UE of the updated system information via the dedicated RRC message.

For NG-RAN, the gNB-CU shall include the gNB-CU System Information IE in the GNB-DU CONFIGURATION UPDATE ACKNOWLEDGE message. The SIB type to Be Updated List IE shall contain the full list of SIBs to be broadcast.

For NG-RAN, the gNB-DU may include the RAN Area Code IE in the GNB-DU CONFIGURATION UPDATE message. The gNB-CU shall store and replace any previously provided RAN Area Code IE by the received RAN Area Code IE.

For NG-RAN, the gNB-DU may include the Supported MBS FSA ID List IE in the Served Cell Information IE in the GNB-DU CONFIGURATION UPDATE message. The gNB-CU shall store and replace any previously provided MBS FSA ID list IE by the received MBS FSA ID list IE.

If Available PLMN List IE, and optionally also Extended Available PLMN List IE, is contained in GNB-DU CONFIGURATION UPDATE ACKNOWLEDGE message, the gNB-DU shall overwrite the whole available PLMN list and update the corresponding system information.

If Available SNPN ID List IE is contained in GNB-DU CONFIGURATION UPDATE ACKNOWLEDGE message, the gNB-DU shall overwrite the whole available SNPN ID list and update the corresponding system information.

If in GNB-DU CONFIGURATION UPDATE message, the Cell Direction IE is present, the gNB-CU should use it to understand whether the cell is for UL or DL only. If in GNB-DU CONFIGURATION UPDATE message, the Cell Direction IE is omitted in the Served Cell Information IE it shall be interpreted as that the Cell Direction is Bi-directional.

If the GNB-DU CONFIGURATION UPDATE message includes gNB-DU TNL Association To Remove List IE, and the Endpoint IP address IE and the Port Number IE for both TNL endpoints of the TNL association(s) are included in the gNB-DU TNL Association To Remove List IE, the gNB-CU shall, if supported, consider that the TNL association(s) indicated by both received TNL endpoints will be removed by the gNB-DU. If the Endpoint IP address IE, or the Endpoint IP address IE and the Port Number IE for one or both of the TNL endpoints is included in the gNB-DU TNL Association To Remove List IE in GNB-DU CONFIGURATION UPDATE message, the gNB-CU shall, if supported, consider that the TNL association(s) indicated by the received endpoint IP address(es) will be removed by the gNB-DU.

If the Intended TDD DL-UL Configuration IE is present in the GNB-DU CONFIGURATION UPDATE message, the receiving gNB-CU shall use the received information for Cross Link Interference management and/or NR-DC power coordination. The gNB-CU may merge the Intended TDD DL-UL Configuration information received from two or more gNB-DUs. The gNB-CU shall consider the received Intended TDD DL-UL Configuration IE content valid until reception of an update of the IE for the same cell(s).

If the Aggressor gNB Set ID IE is included in the Served Cell Information IE in the GNB-DU CONFIGURATION UPDATE message, the gNB-CU shall, if supported, take it into account.

If the Victim gNB Set ID IE is included in the Served Cell Information IE in the GNB-DU CONFIGURATION UPDATE message, the gNB-CU shall, if supported, take it into account.

If the GNB-DU CONFIGURATION UPDATE message includes Transport Layer Address Info IE, the gNB-CU shall, if supported, take into account for IPSec tunnel establishment.

If the GNB-DU CONFIGURATION UPDATE ACKNOWLEDGE message includes Transport Layer Address Info IE, the gNB-DU shall, if supported, take into account for IPSec tunnel establishment.

If the GNB-DU CONFIGURATION UPDATE ACKNOWLEDGE message contains the Uplink BH Non-UP Traffic Mapping IE, the gNB-DU shall, if supported, consider the information therein for mapping of non-UP uplink traffic.

If the SFN Offset IE is contained in the Served Cell Information IE in GNB-DU CONFIGURATION UPDATE message, the gNB-CU shall, if supported, use this information to deduce the SFNO offset of the reported cell.

If the NR Cell PRACH Configuration IE is included in the Served Cell Information IE contained in the GNB-DU CONFIGURATION UPDATE message, the gNB-CU may store the information, and forward it to other RAN nodes for RACH optimisation.

If the GNB-DU CONFIGURATION UPDATE ACKNOWLEDGE message contains the BAP Address IE, the gNB-DU shall, if supported, store the received BAP address and use it.

If the Coverage Modification Notification IE is contained in the GNB-DU CONFIGURATION UPDATE message, the gNB-CU shall, if supported, take it into account for Coverage and Capacity Optimization.

If the Cells for SON IE is present in the GNB-DU CONFIGURATION UPDATE ACKNOWLEDGE message, the gNB-DU may store or update this information and behaves as follows:

- For each served cell indicated by the NR CGI IE included within the Cells for SON Item IE, the gNB-DU may adjust the PRACH configuration of this served cell.
- If the Neighbour NR Cells for SON List IE is present in the Cells for SON Item IE, the gNB-DU may take the PRACH configuration of neighbour cells included in the Neighbour NR Cells for SON List IE into consideration when adjusting the PRACH configuration of the served cell.

If the RedCap Broadcast Information IE is contained in the Served Cell Information IE in the GNB-DU CONFIGURATION UPDATE message, the gNB-CU may use this information to determine a suitable target in case of subsequent outgoing mobility involving RedCap UEs.

If the TAI NSAG Support List IE is included in the Served Cell Information IE in the GNB-DU CONFIGURATION UPDATE message, the gNB-CU shall, if supported, use this information.

If the gNB-DU Name IE is included in the GNB-DU CONFIGURATION UPDATE message, the gNB-CU may store it or update this IE value if already stored, and use it as a human readable name of the gNB-DU. If the Extended gNB-DU Name IE is included in the GNB-DU CONFIGURATION UPDATE message, the gNB-CU may store it or update this IE value if already stored, and use it as a human readable name of the gNB-DU and shall ignore the gNB-DU Name IE if also included.

Figure 12:
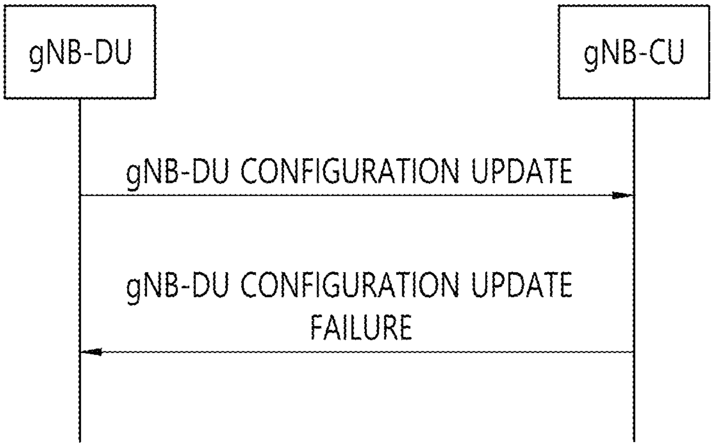
FIG. 12 shows an example of an unsuccessful operation for gNB-DU Configuration Update procedure to which implementations of the present disclosure is applied.

FIG. 12 shows an example of an unsuccessful operation for gNB-DU Configuration Update procedure to which implementations of the present disclosure is applied.

If the gNB-CU cannot accept the update, it shall respond with a GNB-DU CONFIGURATION UPDATE FAILURE message and appropriate cause value.

If the GNB-DU CONFIGURATION UPDATE FAILURE message includes the Time To Wait IE, the gNB-DU shall wait at least for the indicated time before reinitiating the GNB-DU CONFIGURATION UPDATE message towards the same gNB-CU.

Hereinafter, technical features related to gNB-CU Configuration Update are described. Section 8.2.5 of 3GPP TS 38.473 v17.3.0 may be referred.

The purpose of the gNB-CU Configuration Update procedure is to update application level configuration data needed for the gNB-DU and gNB-CU to interoperate correctly on the F1 interface. This procedure does not affect existing UE-related contexts, if any. The procedure uses non-UE associated signalling.

Figure 13:
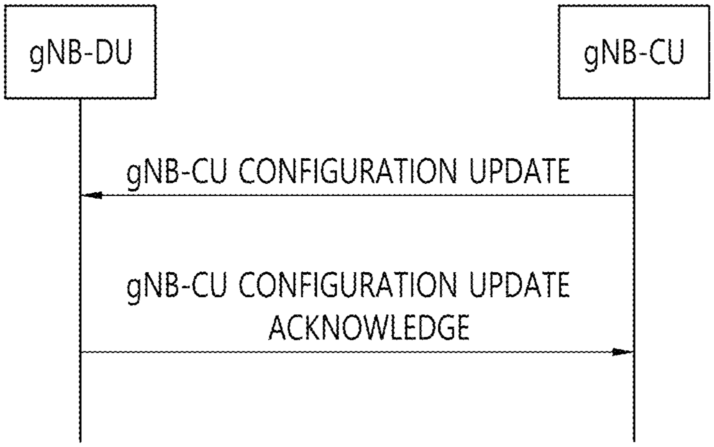
FIG. 13 shows an example of a successful operation for gNB-CU Configuration Update procedure to which implementations of the present disclosure is applied.

FIG. 13 shows an example of a successful operation for gNB-CU Configuration Update procedure to which implementations of the present disclosure is applied.

The gNB-CU initiates the procedure by sending a GNB-CU CONFIGURATION UPDATE message including the appropriate updated configuration data to the gNB-DU. The gNB-DU responds with a GNB-CU CONFIGURATION UPDATE ACKNOWLEDGE message to acknowledge that it successfully updated the configuration data. If an information element is not included in the GNB-CU CONFIGURATION UPDATE message, the gNB-DU shall interpret that the corresponding configuration data is not changed and shall continue to operate the F1-C interface with the existing related configuration data.

The updated configuration data shall be stored in the respective node and used as long as there is an operational TNL association or until any further update is performed.

Figure 14:
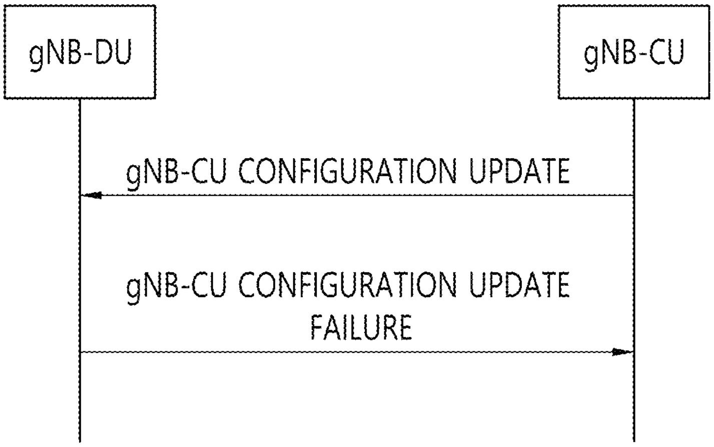
FIG. 14 shows an example of an unsuccessful operation for gNB-CU Configuration Update procedure to which implementations of the present disclosure is applied.

FIG. 14 shows an example of an unsuccessful operation for gNB-CU Configuration Update procedure to which implementations of the present disclosure is applied.

If the gNB-DU cannot accept the update, it shall respond with a GNB-CU CONFIGURATION UPDATE FAILURE message and appropriate cause value.

If the GNB-CU CONFIGURATION UPDATE FAILURE message includes the Time To Wait IE, the gNB-CU shall wait at least for the indicated time before reinitiating the GNB-CU CONFIGURATION UPDATE message towards the same gNB-DU.

Hereinafter, technical features related to UE Context Setup are described. Section 8.3.1 of 3GPP TS 38.473 v17.3.0 may be referred.

The purpose of the UE Context Setup procedure is to establish the UE Context including, among others, SRB, DRB, BH RLC channel, Uu Relay RLC channel, PC5 Relay RLC channel, and SL DRB configuration. The procedure uses UE-associated signalling.

Figure 15:
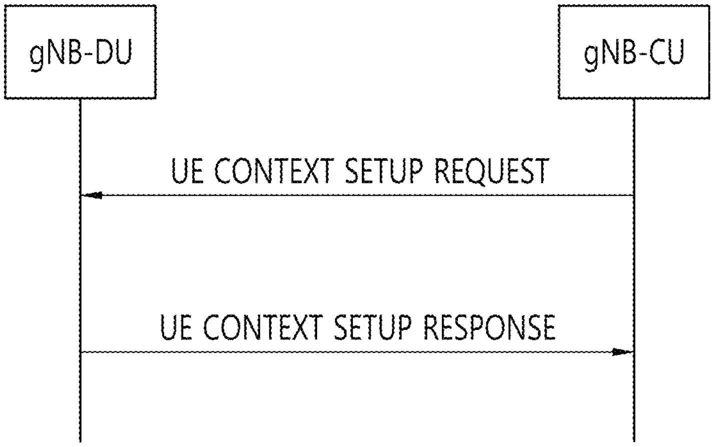
FIG. 15 shows an example of a successful operation for UE Context Setup Request procedure to which implementations of the present disclosure is applied.

FIG. 15 shows an example of a successful operation for UE Context Setup Request procedure to which implementations of the present disclosure is applied.

The gNB-CU initiates the procedure by sending UE CONTEXT SETUP REQUEST message to the gNB-DU. If the gNB-DU succeeds to establish the UE context, it replies to the gNB-CU with UE CONTEXT SETUP RESPONSE. If no UE-associated logical F1-connection exists, the UE-associated logical F1-connection shall be established as part of the procedure. The gNB-CU shall perform RRC Reconfiguration or RRC connection resume. The CellGroupConfig IE shall transparently be signaled to the UE.

If the UE-CapabilityRAT-ContainerList IE is included in the UE CONTEXT SETUP REQUEST, the gNB-DU shall take this information into account for UE specific configurations.

Figure 16:
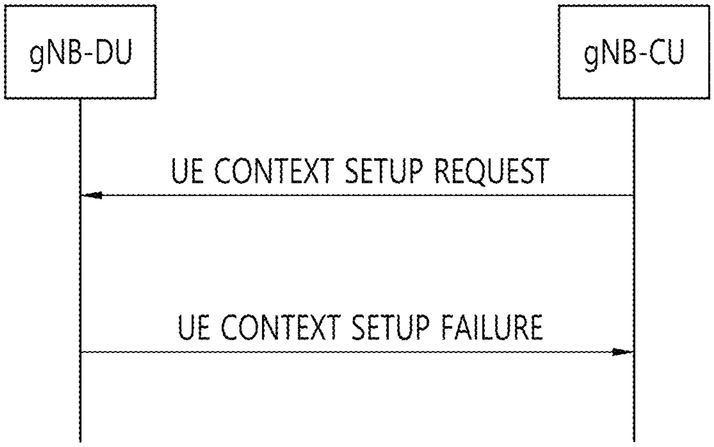
FIG. 16 shows an example of an unsuccessful operation for UE Context Setup Request procedure to which implementations of the present disclosure is applied.

FIG. 16 shows an example of an unsuccessful operation for UE Context Setup Request procedure to which implementations of the present disclosure is applied.

If the gNB-DU is not able to establish an F1 UE context, or cannot even establish one bearer it shall consider the procedure as failed and reply with the UE CONTEXT SETUP FAILURE message. If the Conditional Inter-DU Mobility Information IE was included in the UE CONTEXT SETUP REQUEST message, the gNB-DU shall include the received SpCell ID IE as the Requested Target Cell ID IE in the UE CONTEXT SETUP FAILURE message.

Hereinafter, technical features related to UE Context Modification (gNB-CU initiated) are described. Section 8.3.4 of 3GPP TS 38.473 v17.3.0 may be referred.

The purpose of the UE Context Modification procedure is to modify the established UE Context, e.g., establishing, modifying and releasing radio resources or sidelink resources. This procedure is also used to command the gNB-DU to stop data transmission for the UE for mobility. The procedure uses UE-associated signalling.

Figure 17:
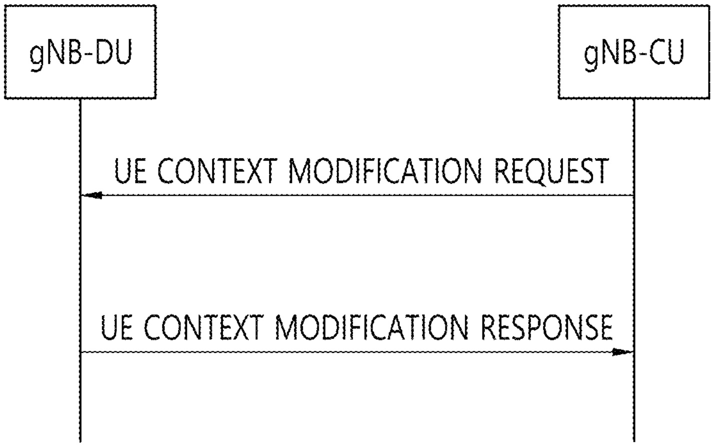
FIG. 17 shows an example of a successful operation for UE Context Setup Request procedure to which implementations of the present disclosure is applied.

FIG. 17 shows an example of a successful operation for UE Context Setup Request procedure to which implementations of the present disclosure is applied.

The UE CONTEXT MODIFICATION REQUEST message is initiated by the gNB-CU.

Upon reception of the UE CONTEXT MODIFICATION REQUEST message, the gNB-DU shall perform the modifications, and if successful reports the update in the UE CONTEXT MODIFICATION RESPONSE message.

If the SpCell ID IE is included in the UE CONTEXT MODIFICATION REQUEST message, the gNB-DU shall replace any previously received value and regard it as a reconfiguration with sync. If the ServCellIndex IE is included in the UE CONTEXT MODIFICATION REQUEST message, the gNB-DU shall take this into account for the indicated SpCell. If the SpCell UL Configured IE is included in the UE CONTEXT MODIFICATION REQUEST message, the gNB-DU shall configure UL for the indicated SpCell accordingly. If the servingCellMO IE is included in the UE CONTEXT MODIFICATION REQUEST message, the gNB-DU shall configure servingCellMO for the indicated SpCell accordingly.

Figure 18:
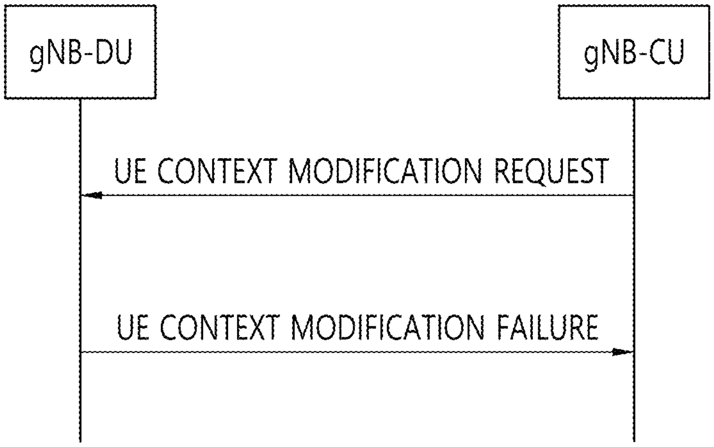
FIG. 18 shows an example of an unsuccessful operation for UE Context Setup Request procedure to which implementations of the present disclosure is applied.

FIG. 18 shows an example of an unsuccessful operation for UE Context Setup Request procedure to which implementations of the present disclosure is applied.

In case none of the requested modifications of the UE context can be successfully performed, the gNB-DU shall respond with the UE CONTEXT MODIFICATION FAILURE message with an appropriate cause value. If the Conditional Intra-DU Mobility Information IE was included in the UE CONTEXT MODIFICATION REQUEST message and set to "CHO-initiation", the gNB-DU shall include the received SpCell ID IE as the Requested Target Cell ID IE in the UE CONTEXT MODIFICATION FAILURE message.

If the gNB-DU is not able to accept the SpCell ID IE in UE CONTEXT MODIFICATION REQUEST message, it shall reply with the UE CONTEXT MODIFICATION FAILURE message.

If the Conditional Intra-DU Mobility Information IE was included and set to "CHO-initiation" or "CHO-replace" but the SpCell ID IE was not included in the UE CONTEXT MODIFICATION REQUEST message, the gNB-DU shall respond with the UE CONTEXT MODIFICATION FAILURE message with an appropriate cause value.

Meanwhile, in NR, various signals for extended reality (XR) service are being discussed.

For example, discussions for NR enhancements are ongoing as follows.

Specify the enhancements related to power saving:

DRX support of XR frame rates corresponding to non-integer periodicities (through at least semi-static mechanisms e.g. RRC signalling);

Specify the enhancements related to capacity:

Multiple CG PUSCH transmission occasions in a period of a single CG PUSCH configuration;

Dynamic indication of unused CG PUSCH occasion(s) based on UCI by the UE;

BSR enhancements including at least new BS Table(s);
Delay reporting of buffered data in uplink;
Provision of XR traffic assistance information for DL and UL (e.g. periodicity)
Discard operation of PDU Sets;

In particular, in relation to DRX support of XR frame rates corresponding to non-integer periodicities, it is necessary to provide a method for supporting DRX with multiple non-integer DRX configuration values for power saving of a terminal that transmits and receives XR traffic.

In addition, due to the nature of XR traffic, the DRX configuration value to support DRX can change frequently. Therefore, if the base station is split into CU-DU, for considering these issues, a method for efficiently managing DRX configuration for providing DRX to a terminal that transmits and receives XR traffic is required.

Therefore, studies for a DRX configuration for XR traffic in a wireless network system are required.

Hereinafter, a method for a DRX configuration for XR traffic in a wireless network system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 19:
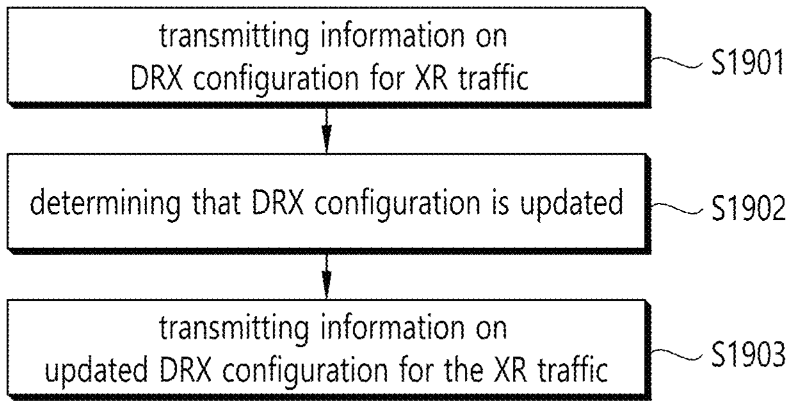
FIG. 19 shows an example of a method for a DRX configuration for XR traffic in a wireless network system, according to some embodiments of the present disclosure.

FIG. 19 shows an example of a method for a DRX configuration for XR traffic in a wireless network system, according to some embodiments of the present disclosure.

In particular, FIG. 19 shows an example of a method performed by a Central Unit (CU) of a gNB.

For example, a gNB may include a Central Unit (CU) and one or more Distributed Units (DUs).

In step S1901, a CU of a RAN may transmit, to a Distributed Unit (DU) of the RAN node, a first message including information on a DRX configuration for XR traffic.

For example, the DRX configuration for the XR traffic may include a first set of periodicities for the XR traffic.

For example, the first set of periodicities may be different from the second set of periodicities.

For example, the first message may include multiple DRX configurations for XR traffic.

For example, gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU.

For example, gNB Distributed Unit (gNB-DU) may be a logical node hosting RLC, MAC and PHY layers of the gNB or en-gNB, and its operation is partly controlled by gNB-CU. One gNB-DU may support one or multiple cells. One cell is supported by only one gNB-DU. The gNB-DU may terminate the F1 interface connected with the gNB-CU. For DC operation, the MgNB-DU may designate the gNB-DU of an en-gNB or a gNB acting as master node, and the SgNB-DU may designate the gNB-DU of an en-gNB or a gNB acting as secondary node.

In step S1902, a CU of a RAN may determine that the DRX configuration is updated.

In step S1903, a CU of a RAN may transmit, to the DU of the RAN node, a second message including information on the updated DRX configuration for the XR traffic.

For example, the updated DRX configuration for the XR traffic may include a second set of periodicities for the XR traffic.

For example, the second message may include an index of the updated DRX configuration. The updated DRX configuration may be one of the multiple DRX configurations included in the first message. For example, the information on the updated DRX configuration for the XR traffic may include an index of the updated DRX configuration For example, the wireless device may receive, from the DU, an F1 Setup Request message. In this example, the first message may be an F1 Setup Response message.

For example, the second message may be a gNB-CU Configuration Update message. In this example, the wireless device may receive, from the DU, a gNB-CU Configuration Update Acknowledge message.

For example, the wireless device may receive, from the DU, a gNB-DU Configuration Update message. In this example, the second message is a gNB-DU Configuration Update Acknowledge message.

For example, the wireless device may transmit, to the DU, a third message including a DRX configuration indication. In this example, the DRX configuration indication may include information on a DRX configuration set. For example, the third message may be a UE Context Setup Request message. For example, the third message may be a UE Context Modification Request message.

According to some embodiments of the present disclosure, the DU of the gNB may be in communication with at least one of a user equipment, a network, or an autonomous vehicle other than the wireless device.

Figure 20:
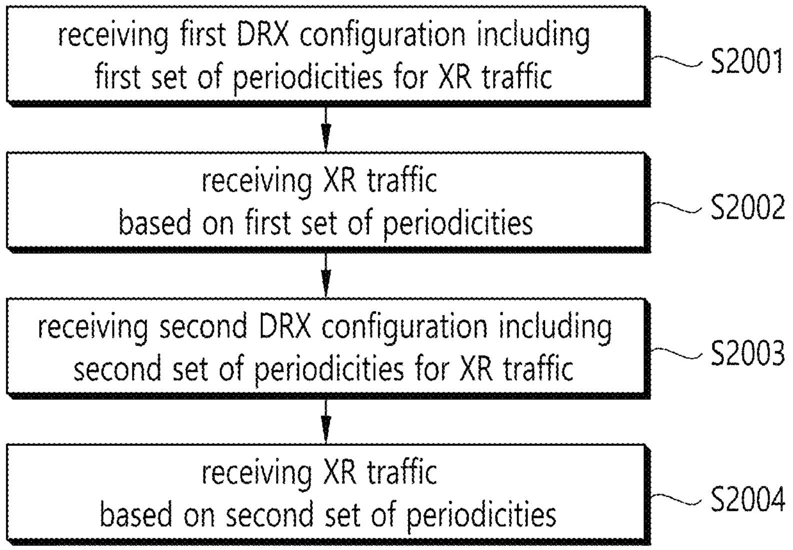
FIG. 20 shows an example of a method for a DRX configuration for XR traffic in a wireless network system, according to some embodiments of the present disclosure.

FIG. 20 shows an example of a method for a DRX configuration for XR traffic in a wireless network system, according to some embodiments of the present disclosure.

In particular, FIG. 20 shows an example of a method performed by a wireless device.

In this example, a gNB may include a Central Unit (CU) and one or more Distributed Units (DUs).

In step S2001, a wireless device may receive, from a distributed unit (DU) of a gNB, a first Discontinuous Reception (DRX) configuration.

For example, the first DRX configuration may be provided from a central unit (CU) of the gNB to the DU of the gNB.

For example, the first DRX configuration may include a first set of periodicities for the XR traffic.

In step S2002, a wireless device may receive, from the DU of the gNB, XR traffic based on the first set of periodicities.

For example, the wireless device may receive first XR traffic based on a first periodicity included in the first set, second XR traffic based on a second periodicity included in the first set, and . . . the n-th XR traffic based on a n-th XR periodicity included in the first set.

In step S2003, a wireless device may receive, from the DU of the gNB, a second DRX configuration.

For example, the second DRX configuration may be provided from the CU of the gNB to the DU of the gNB.

For example, the second DRX configuration may include a second set of periodicities for the XR traffic.

For example, the wireless device may receive first XR traffic based on a first periodicity included in the first set, second XR traffic based on a second periodicity included in the first set, and . . . the n-th XR traffic based on a n-th XR periodicity included in the first set.

In step S2004, a wireless device may receive, from the DU of the gNB, XR traffic based on the second set of periodicities.

For example, the wireless device may receive first XR traffic based on a first periodicity included in the second set, second XR traffic based on a second periodicity included in the second set, and . . . the n-th XR traffic based on a n-th XR periodicity included in the second set.

Hereinafter, an embodiment of a method for signalling for power saving support of UE in XR environment will be described.

When a CU-DU split base station performs DRX for UEs transmitting and receiving XR traffic, the gNB-CU may provide the gNB-DU with DRX configuration information considering XR traffic characteristics in advance. If updating of corresponding information is required, updated DRX configuration information may also be provided. At this time, DRX configuration information may be several sets composed of a combination of DRX configuration values. Each set may have a corresponding index value. In addition, the gNB-CU may provide the gNB-DU with DRX configuration related to a specific UE transmitting and receiving XR traffic. In addition, a updated DRX configuration can be provided. The DRX configuration value provided at this time may also be configured as a set and may have a corresponding index value.

Figure 21:
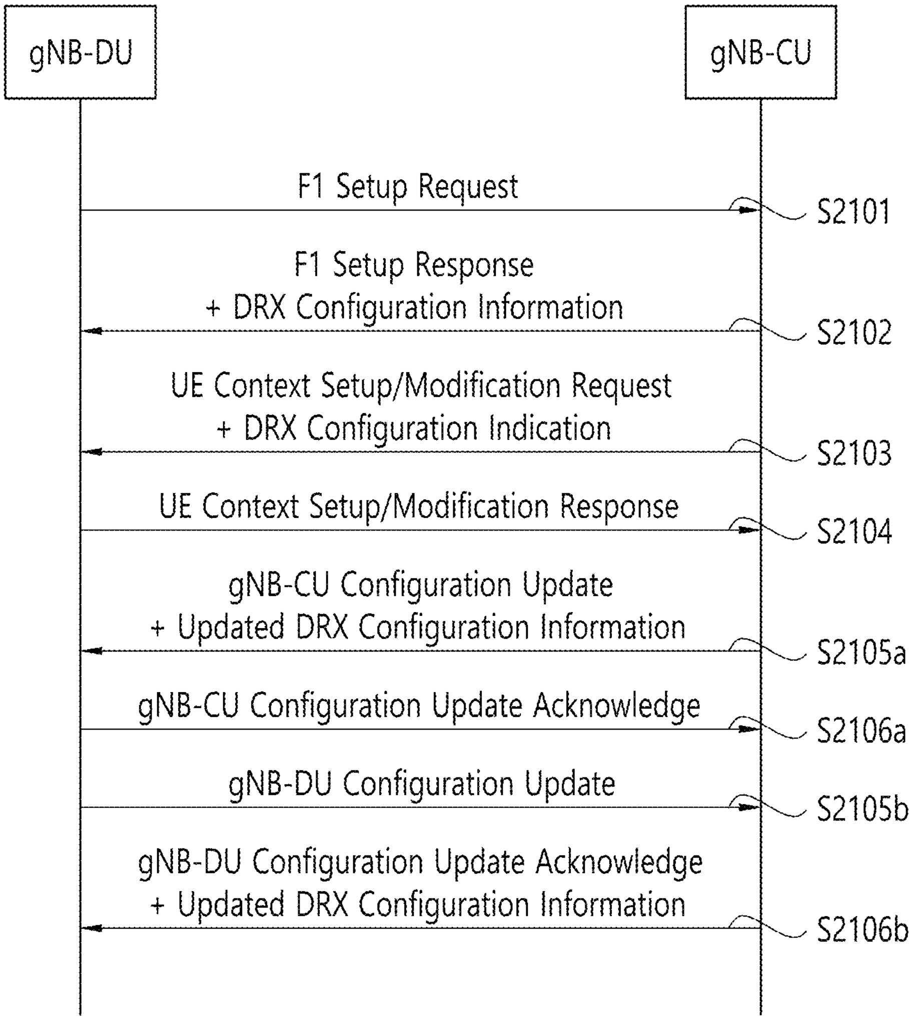
FIG. 21 shows an example of a procedures for providing information related to DRX Configuration considering XR traffic feature.

FIG. 21 shows an example of a procedures for providing information related to DRX Configuration considering XR traffic feature.

In particular, in FIG. 21, when a CU-DU split base station performs DRX for terminals transmitting and receiving XR traffic, a method for the gNB-CU to provide DRX configuration-related information considering XR traffic characteristics to the gNB-DU may be suggested. In addition, a method of providing the updated information may be suggested.

In step S2101, the gNB-DU may send an F1 Setup Request message for F1 setup with the gNB-CU.

In step S2102, after receiving the F1 Setup Request message, the gNB-CU may send an F1 Setup Response message to the gNB-DU in response. This message may include DRX Configuration Information considering XR traffic characteristics. DRX Configuration Information may be several sets composed of a combination of DRX configuration values. Also, each set may have a corresponding index value. After receiving the DRX Configuration Information, the gNB-DU may store it and use the stored value for DRX of a UE transmitting and receiving XR traffic, until it receives updated DRX Configuration Information later.

In step S2103, in order to provide or change the DRX configuration related to a terminal with an RRC connection that transmits and receives XR traffic, the gNB-CU may send a UE Context Setup Request message, a UE Context Modification Request message, an existing F1AP message, or a new F1AP message, which includes DRX Configuration Indication, to the gNB-DU. That is, the gNB-DU may receive or change the DRX configuration related to a UE having an RRC connection for transmitting and receiving XR traffic through a message received from the gNB-CU.

For example, the DRX Configuration Indication may include a DRX configuration set or an index of the DRX configuration set.

In step S2104, after receiving the DRX Configuration Indication from the gNB-CU, the gNB-DU stores it. The gNB-DU applies the provided or changed DRX configuration value to perform DRX for a UE with an RRC connection that transmits and receives XR traffic, until an updated DRX configuration value is provided later.

One of the following two methods can be used according to the F1AP procedure used when the gNB-CU delivers the updated DRX Configuration Information to the gNB-DU.

Option 1:

In step S2105*a*, to provide updated DRX configuration, the gNB-CU may transmit the gNB-CU Configuration Update message, the existing F1AP message, or the new F1AP message by including the Updated DRX Configuration Information to the gNB-DU. Updated DRX Configuration Information includes changed or new DRX configuration sets, and may also include an index of the changed or new DRX configuration set.

In step S2106*a*, after receiving the Updated DRX Configuration Information, a gNB-DU may store received information. The gNB-DU may use the stored value for DRX of a UE transmitting and receiving XR traffic, until it receives updated DRX Configuration Information later. The gNB-DU may send a gNB-CU Configuration Update Acknowledge message, an existing F1AP message, or a new F1AP message to the gNB-CU in response.

Option 2:

In step S2105*b*, the gNB-DU may send a gNB-DU Configuration Update message, an existing F1AP message, or a new F1AP message to the gNB-CU.

In step S2106*b*, after receiving the message from the gNB-DU, the gNB-CU may transmit a gNB-DU Configuration Update Acknowledge message, an existing F1AP message, or a new FLAP message in response. This message may include Updated DRX Configuration Information for providing the updated DRX configuration to the gNB-DU. Updated DRX Configuration Information includes changed or new DRX configuration sets, and may also include an index of the changed or new DRX configuration set. After receiving the Updated DRX Configuration Information, the gNB-DU can store the received information. The gNB-DU may use the stored value for DRX of the UE transmitting and receiving XR traffic, until an updated DRX Configuration Information is received later.

According to some embodiments of the present disclosure, when a CU-DU split base station performs DRX for UEs transmitting and receiving XR traffic, the gNB-CU may provide DRX configuration information considering XR traffic characteristics to the gNB-DU, or may change and provide it.

After receiving the DRX configuration information, the gNB-DU may store the received information. The gNB-DU may use the stored value for DRX of the UE transmitting and receiving XR traffic, until an updated DRX configuration information is received later.

For example, DRX configuration information may be several sets composed of a combination of DRX configuration values, and each set may have a corresponding index value.

For example, in order to provide or change DRX configuration related to an RRC-connected UE, a DRX configuration indication may be provided to the gNB-DU.

For example, the corresponding indication may include a DRX configuration set or an index of the DRX configuration set.

Some of the detailed steps shown in the examples of FIGS. 19 to 21 may not be essential steps and may be omitted. In addition to the steps shown in FIGS. 19 to 21, other steps may be added, and the order of the steps may vary. Some of the above steps may have their own technical meaning.

Hereinafter, an apparatus for a DRX configuration for XR traffic in a wireless network system, according to some embodiments of the present disclosure, will be described.

Herein, the gNB may be the gNB in FIG. 7. For example, the gNB may include a Central Unit (CU) and a Distributed Unit (DU)

For example, a CU of a Radio Access Network (RAN) may perform the methods described above. The detailed description overlapping with the above-described contents could be simplified or omitted.

According to some embodiments of the present disclosure, a Distributed Unit (DU) of a RAN in a wireless communication system may comprises a transceiver, a memory, and at least one processor operatively coupled to the memory and the transceiver. A Central Unit (CU) of a RAN in a wireless communication system may comprises a memory and at least one processor operatively coupled to the memory.

The at least one processor may be adapted to: transmit, to a Distributed Unit (DU) of the RAN node, a first message including information on a Discontinuous Reception (DRX) configuration for Extended reality (XR) traffic, wherein the DRX configuration for the XR traffic includes a first set of periodicities for the XR traffic; determine that the DRX configuration is updated; transmit, to the DU of the RAN node, a second message including information on the updated DRX configuration for the XR traffic, wherein the updated DRX configuration for the XR traffic includes a second set of periodicities for the XR traffic.

For example, the first set of periodicities may be different from the second set of periodicities.

For example, the first message may include multiple DRX configurations for XR traffic. For example, the second message may include an index of the updated DRX configuration. For example, the updated DRX configuration may be one of the multiple DRX configurations included in the first message. For example, the information on the updated DRX configuration for the XR traffic may include an index of the updated DRX configuration For example, the at least one processor may be adapted to receive, from the DU, an F1 setup request message. For example, the first message may be an F1 setup response message.

For example, the second message may be a CU configuration update message. For example, the at least one processor may be adapted to receive, from the DU, a CU configuration update acknowledge message.

For example, the at least one processor may be adapted to receive, from the DU, a DU configuration update message. For example, the second message may be a DU configuration update acknowledge message.

For example, the at least one processor may be adapted to transmit, to the DU, a third message including a DRX configuration indication. For example, the DRX configuration indication may include information on a DRX configuration set. For example, the third message may be a UE Context Setup Request message. For example, the third message may be a UE Context Modification Request message.

For example, the DU of the gNB may be in communication with at least one of a user equipment, a network, or an autonomous vehicle other than the wireless device.

Hereinafter, a processor for a Central Unit (CU) of a RAN for a DRX configuration for XR traffic in a wireless network system, according to some embodiments of the present disclosure, will be described.

The processor may be configured to control the CU of the gNB to: transmit, to a Distributed Unit (DU) of the RAN node, a first message including information on a Discontinuous Reception (DRX) configuration for Extended reality (XR) traffic, wherein the DRX configuration for the XR traffic includes a first set of periodicities for the XR traffic; determine that the DRX configuration is updated; transmit, to the DU of the RAN node, a second message including information on the updated DRX configuration for the XR traffic, wherein the updated DRX configuration for the XR traffic includes a second set of periodicities for the XR traffic.

For example, the first set of periodicities may be different from the second set of periodicities.

For example, the first message may include multiple DRX configurations for XR traffic. For example, the second message may include an index of the updated DRX configuration. For example, the updated DRX configuration may be one of the multiple DRX configurations included in the first message. For example, the information on the updated DRX configuration for the XR traffic may include an index of the updated DRX configuration For example, the processor may be configured to control the CU of the gNB to receive, from the DU, an F1 setup request message. For example, the first message may be an F1 setup response message.

For example, the second message may be a CU configuration update message. For example, the processor may be configured to control the CU of the gNB to receive, from the DU, a CU configuration update acknowledge message.

For example, the processor may be configured to control the CU of the gNB to receive, from the DU, a DU configuration update message. For example, the second message may be a DU configuration update acknowledge message.

For example, the processor may be configured to control the CU of the gNB to transmit, to the DU, a third message including a DRX configuration indication. For example, the DRX configuration indication may include information on a DRX configuration set. For example, the third message may be a UE Context Setup Request message. For example, the third message may be a UE Context Modification Request message.

For example, the at least one processor may be further adapted to be in communication with at least one of a user equipment, a network, or an autonomous vehicle other than the wireless device.

For example, the DU of the gNB may be in communication with at least one of a user equipment, a network, or an autonomous vehicle other than the wireless device.

Hereinafter, a non-transitory computer-readable medium has stored thereon a plurality of instructions for a DRX configuration for XR traffic in a wireless network system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For another example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Central Unit (CU) of a gNB.

The stored a plurality of instructions may cause the DU of the gNB to: transmit, to a Distributed Unit (DU) of the RAN node, a first message including information on a Discontinuous Reception (DRX) configuration for Extended reality (XR) traffic, wherein the DRX configuration for the XR traffic includes a first set of periodicities for the XR traffic; determine that the DRX configuration is updated; transmit, to the DU of the RAN node, a second message including information on the updated DRX configuration for the XR traffic, wherein the updated DRX configuration for the XR traffic includes a second set of periodicities for the XR traffic.

For example, the first set of periodicities may be different from the second set of periodicities.

For example, the first message may include multiple DRX configurations for XR traffic. For example, the second message may include an index of the updated DRX configuration. For example, the updated DRX configuration may be one of the multiple DRX configurations included in the first message. For example, the information on the updated DRX configuration for the XR traffic may include an index of the updated DRX configuration For example, the stored a plurality of instructions may cause the DU of the gNB to receive, from the DU, an F1 setup request message. For example, the first message may be an F1 setup response message.

For example, the second message may be a CU configuration update message. For example, the stored a plurality of instructions may cause the DU of the gNB to receive, from the DU, a CU configuration update acknowledge message.

For example, the stored a plurality of instructions may cause the DU of the gNB to receive, from the DU, a DU configuration update message. For example, the second message may be a DU configuration update acknowledge message.

For example, the stored a plurality of instructions may cause the DU of the gNB to transmit, to the DU, a third message including a DRX configuration indication. For example, the DRX configuration indication may include information on a DRX configuration set. For example, the third message may be a UE Context Setup Request message. For example, the third message may be a UE Context Modification Request message.

For example, the DU of the gNB may be in communication with at least one of a user equipment, a network, or an autonomous vehicle other than the wireless device.

Hereinafter, wireless device for a DRX configuration for XR traffic in a wireless network system, according to some embodiments of the present disclosure, will be described.

The wireless device may include a transceiver, a memory, and a processor operatively coupled to the transceiver and the memory. For example, the wireless device may be the first wireless device 100 or the second wireless device 200 of FIGS. 2 and 3, or the UE 100 of FIG. 4.

The processor may be adapted to receive, from a distributed unit (DU) of a gNB, a first Discontinuous Reception (DRX) configuration. For example, the first DRX configuration may be provided from a central unit (CU) of the gNB to the DU of the gNB. For example, the first DRX configuration may include a first set of periodicities for the XR traffic.

The processor may be adapted to receive, from the DU of the gNB, XR traffic based on the first set of periodicities.

The processor may be adapted to receive, from the DU of the gNB, a second DRX configuration. For example, the second DRX configuration may be provided from the CU of the gNB to the DU of the gNB. For example, the second DRX configuration may include a second set of periodicities for the XR traffic.

The processor may be adapted to receive, from the DU of the gNB, XR traffic based on the second set of periodicities.

The present disclosure can have various advantageous effects.

According to some embodiments of the present disclosure, a gNB in CU-DU split could efficiently handle the DRX configuration for XR traffic. In particular, by providing the DRX configuration including a set of periodicities for the XR traffic, the CU of the gNB could efficiently provide the DRX configuration form the XR traffic.

For example, when a CU-DU split base station performs DRX for UEs transmitting and receiving XR traffic, the gNB-CU may provide the gNB-DU with DRX configuration information considering XR traffic characteristics in advance. If updating of corresponding information is required, updated DRX configuration information may also be provided. Since information can be provided in a combination of set and index, information provided during gNB-CU and gNB-DU signaling can be minimized. In addition, through this, the power saving effect of the terminal can be expected by providing DRX to the terminal that transmits and receives XR traffic.

In other words, the gNB-CU may provide DRX configuration considering XR traffic characteristics to the gNB-DU in advance, otherwise the gNB-CU may update and provide the DRX configuration. Corresponding information may be provided as a combination of set and index. Thus, information provided during signaling between the gNB-CU and the gNB-DU could be minimized. In addition, by providing the corresponding information to a terminal that transmits and receives XR traffic, the terminal could save power by applying DRX.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method performed by a Central Unit (CU) of a Radio Access Network (RAN) node in a wireless communication system, the method comprising:

transmitting, to a Distributed Unit (DU) of the RAN node, a first message including information on a Discontinuous Reception (DRX) configuration for Extended reality (XR) traffic, wherein the DRX configuration for the XR traffic includes a first set of periodicities for the XR traffic;

determining that the DRX configuration is updated;

transmitting, to the DU of the RAN node, a second message including information on the updated DRX configuration for the XR traffic, wherein the updated DRX configuration for the XR traffic includes a second set of periodicities for the XR traffic.

2. The method of claim 1, wherein the first set of periodicities is different from the second set of periodicities.

3. The method of claim 1, wherein the first message includes multiple DRX configurations for XR traffic.

4. The method of claim 1, wherein the information on the updated DRX configuration for the XR traffic includes an index of the updated DRX configuration.

5. The method of claim 1, wherein the method further comprises, receiving, from the DU, an F1 Setup Request message.

6. The method of claim 5, wherein the first message is an F1 Setup Response message.

7. The method of claim 1, wherein the second message is a gNB-CU Configuration Update message.

8. The method of claim 7, wherein the method further comprising, receiving, from the DU, a gNB-CU Configuration Update Acknowledge message.

9. The method of claim 1, receiving, from the DU, a gNB-DU Configuration Update message.

10. The method of claim 9, wherein the second message is a gNB-DU Configuration Update Acknowledge message.

11. The method of claim 1, wherein the method further comprising, transmitting, to the DU, a third message including a DRX configuration indication, wherein the DRX configuration indication includes information on a DRX configuration set.

12. The method of claim 11, wherein the third message is a UE Context Setup Request message.

13. The method of claim 11, wherein the third message is a UE Context Modification Request message.

14. The method of claim 1, wherein the DU is in communication with at least one of a user equipment, a network, or an autonomous vehicle other than the wireless device.

15. A Central Unit (CU) of a Radio Access Network (RAN) node in a wireless communication system comprising:

a transceiver;

a memory; and at least one processor operatively coupled to the memory and the transceiver, and adapted to:

transmit, to a Distributed Unit (DU) of the RAN node, a first message including information on a Discontinuous Reception (DRX) configuration for Extended reality (XR) traffic, wherein the DRX configuration for the XR traffic includes a first set of periodicities for the XR traffic;

determine that the DRX configuration is updated;

transmit, to the DU of the RAN node, a second message including information on the updated DRX configuration for the XR traffic, wherein the updated DRX configuration for the XR traffic includes a second set of periodicities for the XR traffic.

16. The CU of the RAN node of claim 15, wherein the first set of periodicities is different from the second set of periodicities.

17. The CU of the RAN node of claim 15, wherein the first message includes multiple DRX configurations for XR traffic.

18. The CU of the RAN node of claim 15, wherein the information on the updated DRX configuration for the XR traffic includes an index of the updated DRX configuration.

19. The CU of the RAN node of claim 15, wherein the at least one processor is further adapted to, receive, from the DU, an F1 setup request message.

20. A wireless device in a wireless communication system comprising:

a transceiver;

a memory; and a processor operatively coupled to the transceiver and the memory, and adapted to:

receive, from a distributed unit (DU) of a gNB, a first Discontinuous Reception (DRX) configuration, wherein the first DRX configuration is provided from a central unit (CU) of the gNB to the DU of the gNB, and wherein the first DRX configuration includes a first set of periodicities for the XR traffic; and receive, from the DU of the gNB, XR traffic based on the first set of periodicities;

receive, from the DU of the gNB, a second DRX configuration, wherein the second DRX configuration is provided from the CU of the gNB to the DU of the gNB, and wherein the second DRX configuration includes a second set of periodicities for the XR traffic; and receive, from the DU of the gNB, XR traffic based on the second set of periodicities.

* * * * *